United States Patent
Ong et al.

(10) Patent No.: US 11,770,246 B2
(45) Date of Patent: Sep. 26, 2023

(54) SECURELY TRANSFERRING KEY MATERIALS BETWEEN PROCESSORS IN A MULTI-PROCESSOR DEVICE

(71) Applicant: MOTOROLA SOLUTIONS, INC., Chicago, IL (US)

(72) Inventors: Hean Kuang Ong, Georgetown (MY); Mark Shahaf, Vernon Hills, IL (US); Mark Wealleans, Andover (GB)

(73) Assignee: MOTOROLA SOLUTIONS, INC., Chicago, IL (US)

(*) Notice: Subject to any disclaimer, the term of this patent is extended or adjusted under 35 U.S.C. 154(b) by 494 days.

(21) Appl. No.: 17/010,011

(22) Filed: Sep. 2, 2020

(65) Prior Publication Data
US 2022/0069988 A1 Mar. 3, 2022

(51) Int. Cl.
| | |
|---|---|
| H04L 9/08 | (2006.01) |
| G06F 9/54 | (2006.01) |
| G06F 21/60 | (2013.01) |
| G06F 21/57 | (2013.01) |

(52) U.S. Cl.
CPC .............. *H04L 9/0861* (2013.01); *G06F 9/54* (2013.01); *G06F 21/575* (2013.01); *G06F 21/602* (2013.01); *H04L 9/0894* (2013.01); *G06F 2221/034* (2013.01)

(58) Field of Classification Search
CPC ....... H04L 9/0861; H04L 9/0894; G06F 9/54; G06F 21/575; G06F 21/602; G06F 2221/034

USPC ................................................ 713/1, 2, 100
See application file for complete search history.

(56) References Cited

U.S. PATENT DOCUMENTS

| | | | |
|---|---|---|---|
| 9,137,480 B2 * | 9/2015 | Schlarb | G06F 21/10 |
| 2014/0156534 A1 * | 6/2014 | Quigley | G06Q 20/34 705/71 |
| 2016/0099922 A1 * | 4/2016 | Dover | H04L 9/0822 713/171 |
| 2016/0300064 A1 | 10/2016 | Stewart et al. | |

FOREIGN PATENT DOCUMENTS

FR 2862397 A1 5/2005

* cited by examiner

*Primary Examiner* — Michael J Brown
(74) *Attorney, Agent, or Firm* — Raguraman Kumaresan

(57) ABSTRACT

A multi-processor device includes a first processor implemented with a secured key derivation and storage component and a second processor implemented without a secured key derivation and storage component. In operation, the second processor is configured to execute an initial boot process by loading a limited functionality boot image when the multi-processor device is powered on. During the execution of the initial boot process, the second processor provisions a secure storage container to hold a key material and sends a request to the first processor for a key material. In response, the second processor receives a key material derived at the first processor. The second processor then stores the key material in a volatile memory portion of the secure storage container. The second processor executes a main boot process only after erasing instances of the key material temporarily stored outside of the secure storage container.

20 Claims, 3 Drawing Sheets

SECURELY TRANSFERRING KEY MATERIALS BETWEEN PROCESSORS IN A MULTI-PROCESSOR DEVICE

BACKGROUND

Some electronic devices, including communication devices, incorporate multiple processors of different capabilities. For example, in radio communication devices, a processor without a key generation or secure key storage capability may require access to a key material to securely encrypt and store data. In this case, the processor without the key generation or secure key storage capability may need to rely on other processors implemented at the radio communication device to obtain the necessary key material. However, simply transferring key material between processors may lead to unauthorized programs accessing the key material temporarily stored during the transfer of the key materials. Transferring key materials between processors can also be problematic for security evaluations if there is no trust in the communication path used to transfer the key materials between the processors.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
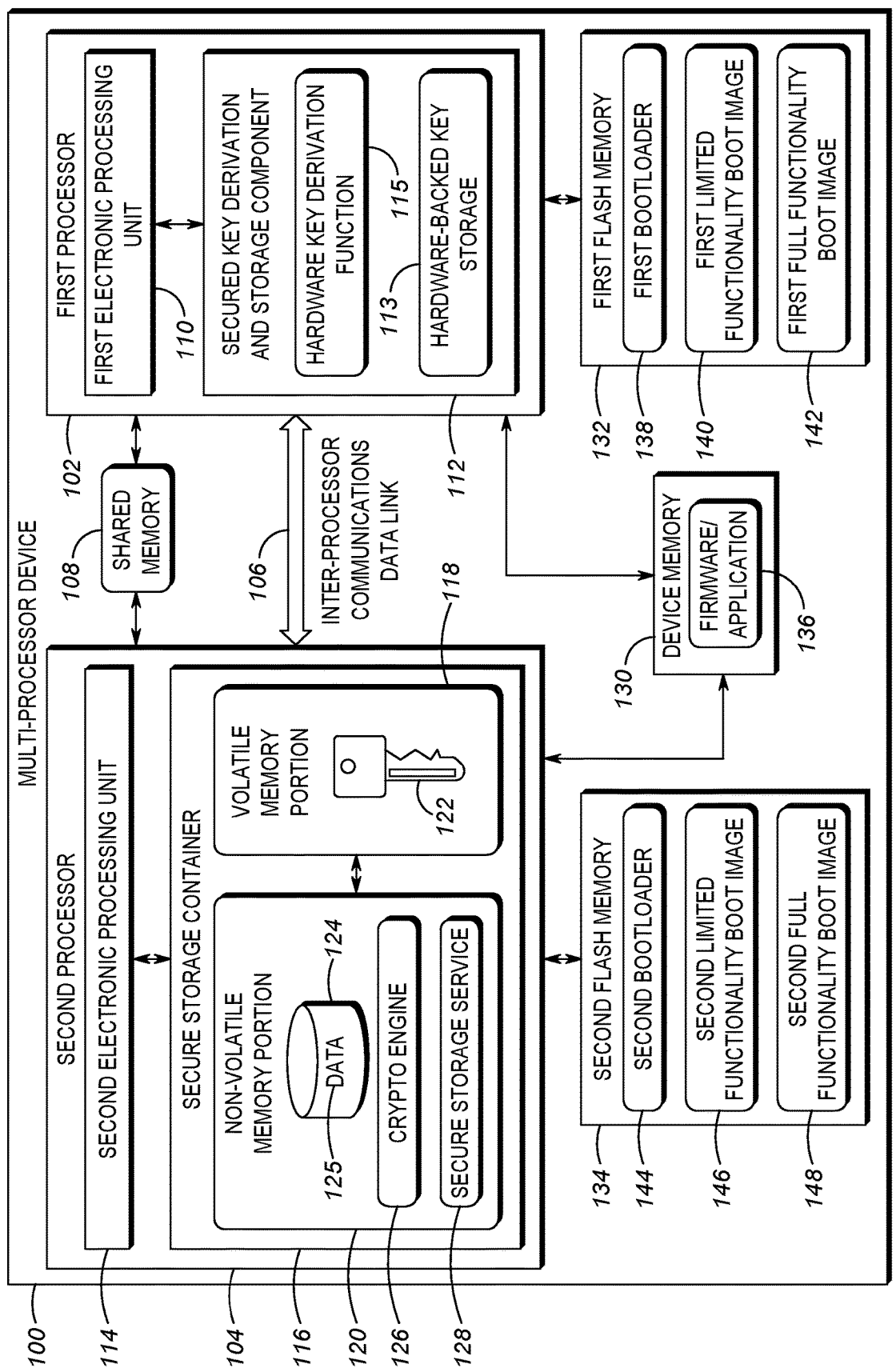
FIG. 1 is a device diagram illustrating a multi-processor device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

One embodiment provides a multi-processor device. The multi-processor device includes a first processor implemented with a secured key derivation and storage component, a second processor implemented without a secured key derivation and storage component, and an inter-processor communications data link enabling the first and second processors to exchange data with each other. The second processor is configured to execute an initial boot process by loading a limited functionality boot image when the multi-processor device is powered on, and further wherein the second processor is configured to, during the execution of the initial boot process: provision a secure storage container to hold a key material; send, via the inter-processor communications data link, a request to the first processor for a key material; receive, via the inter-processor communications data link, a key material derived using the secured key derivation and storage component implemented at the first processor in response to the request; store the key material in a volatile memory portion of the secure storage container; and erase instances of the key material temporarily stored outside of the secure storage container.

Another embodiment provides a method of securely transferring key material between processors in a multi-processor device comprising a first processor implemented with a secured key derivation and storage component and a second processor implemented without a secured key derivation and storage component. The method includes executing, at the second processor, an initial boot process by loading a limited functionality boot image when the multi-processor device is powered on. Execution of the initial boot process at the second processor further comprises: provisioning a secure storage container to hold a key material; sending, via an inter-processor communications data link established between the first processor and the second processor, a request to the first processor for a key material; receiving, via the inter-processor communications data link, a key material derived using the secured key derivation and storage component implemented at the first processor in response to the request; storing the key material in a volatile memory portion of the secure storage container; and erasing instances of the key material temporarily stored outside of the secure storage container.

Each of the above-mentioned embodiments will be discussed in more detail below, starting with example device architecture of the multi-processor device in which the embodiments may be practiced, followed by an illustration of processing blocks for achieving an improved technical method for securely transferring key material between processors in a multi-processor device. Example embodiments are herein described with reference to flowchart illustrations and/or block diagrams of methods, apparatus (systems and devices) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a block diagram illustrates a multi-processor device 100 in accordance with embodiments. The multi-processor device 100 includes a first processor 102, a second processor 104, an inter-processor communications data link 106, and a shared memory 108. The multi-processor device 100 may be a portable radio, mobile device, or another electronic device that includes multiple processors with different security capabilities. In some embodiments, the multi-processor device 100 includes fewer or additional components in configurations different from that illustrated in FIG. 1. For example, when the multi-processor device 100 is operating as a portable radio device, the multi-processor device 100 may include additional components such as a radio-frequency (RF) transceiver, microphone, speaker, display, and other processors and chipsets (not shown).

The first processor 102 is implemented with a first electronic processing unit 110 (for example, a microprocessor or another suitable programming device) and a secured key derivation and storage component 112. In accordance with embodiments, the secured key derivation and storage component 112 includes a hardware-backed key storage 113 and a hardware key derivation function 115. The secured key derivation and storage component 112 is configured to extract and unseal key materials (e.g., a master key such as a key encryption key) from the hardware-backed key storage 113. Alternatively, the secured key derivation and storage component 112 may derive a new key material (e.g., a derived key encryption key (DKEK)) from a pre-stored key material (e.g., key encryption key) using a hardware key derivation function 115. In accordance with embodiments, the security of key materials derived at the hardware key derivation function 115 and/or stored at the hardware-backed key storage 113 is guaranteed at a hardware level as operating system kernels, firmware, software applications, or other programs that may be operating in the multi-processor device 100 do not have access to the hardware key derivation function 115 or the hardware-backed key storage 113 of the secured key derivation and storage component 112. Therefore, the first processor 102 is also referred to as a secure processor 102.

In accordance with embodiments, the second processor 104 is implemented without the secured key derivation and storage component 112. Therefore, the second processor 104 is also referred to as a non-secure processor 104. However, embodiments of the disclosure described herein ensures that the second processor 104 is able to obtain and store key materials in a secure manner. The second processor 104 is implemented with a second electronic processing unit 114 (for example, a microprocessor or another suitable programming device) and a secure storage container 116. The secure storage container 116 is a software confined domain (e.g., Security-Enhanced Linux (SELinux) confined domain) within one or more memory devices having a volatile memory portion 118 and a non-volatile memory portion 120. The one or more memory devices used for provisioning the volatile memory portion 118 and non-volatile memory portion 120 may correspond to memory devices implemented within and/or outside of the second processor 104. In one embodiment, the volatile memory portion 118 may correspond to an internal random access memory (RAM) implemented within the second processor 104. In another embodiment, the volatile memory portion 118 may correspond to an external random access memory (e.g., device memory 130) implemented outside of the second processor 104. Similarly, in embodiments where the second processor 104 does not have a memory device with a non-volatile memory portion, the non-volatile memory portion 120 may be allocated using an external read-write memory (e.g., device memory 130).

The volatile memory portion 118 is programmed to securely store a key material 122 transferred from the first processor 102 during execution of an initial boot process (i.e., initiated by loading a limited functionality boot image) by the second electronic processing unit 114 of the second processor 104. Since programs such as firmware and application are not yet loaded for execution by the second processor 104 during the initial boot process, these programs cannot access the key material 122 stored in the volatile memory portion 118 of the secure storage container 116 and therefore the key material 122 is secure within the volatile memory portion 118 of the secure storage container 116.

The non-volatile memory portion 120 includes a data store 124, a cryptographic engine 126, and a secure storage service 128. The data store 124 contains data 125 (e.g., credentials such as a Wi-Fi passphrase) that needs to be protected at the second (i.e., non-secure) processor 104. The data 125 is protected using the key material 122 acquired from the first processor during the key transfer process (see methods 200, 300 described with reference to FIGS. 2 and 3) and further stored at the volatile memory portion 118 of the secure storage container 116. The cryptographic engine 126 encrypts the data 125 stored at the data store 124 using the key material 122 acquired from the first processor 102. The secure storage service 128 acts as an interface for a firmware or a software application (which are initialized after execution of a main boot process at the second processor 104 by loading a full functionality boot image) to access the data 125 encrypted at the data store 124 using the key material 122. For example, when a firmware or a software application needs access to a credential (i.e., data 125) stored in the secure storage container 116 for connecting to a wireless service, the firmware or the software application sends a request to the secure storage service 128. The secure storage service 128 obtains the credential by decrypting the data 125 stored at the data store 124 via the cryptographic engine 126. The secure storage service 128 then sends the credential to the firmware or software application to enable them to connect to the wireless service.

The shared memory 108 includes a data storage area, for example, a random access memory (RAM) that is accessible to both the first and second processors 102, 104. The first and second processors 102, 104 are configured to read and write data to the shared memory 108 to exchange information between the embedded systems. In one embodiment, the shared memory 108 exists in the memory of one of the first or second processors 102, 104, and is accessible to both processors.

The first and second processors 102, 104, shared memory 108, as well as various other modules and components included in the multi-processor device 100, are coupled by one or more electrical connections, for example, control or data buses to enable communication therebetween. The use of such connections, including control and data buses, for the interconnection between and exchange of information among the various modules and components would be apparent to a person skilled in the art. For example, the control or data buses interconnecting the first and second processors 102, 104, or alternatively the shared memory 108 or portions of the device memory 130 may be used to implement the inter-processor communications data link 106 for facilitating the transfer of key materials and exchange of corresponding messages associated with the transfer of key materials between the first and second processors 102, 104. Accordingly, in accordance with some embodiments, instances of key materials that are temporarily cached or stored at inter-processor communications data link 106 including at the shared memory 108 or a device memory 130 are erased before the main boot process is executed at the second processor 104 by loading a second full functionality boot image 148 or at the first processor 102 by loading a first full functionality boot image 142.

The multi-processor device 100 further includes a device memory 130, a first flash memory 132 that enables execution of boot processes (both initial and main boot processes) at the first processor 102, and a second flash memory 134 that enables execution of boot processes (both initial and main boot processes) at the second processor 104.

The device memory 130 may include a program storage area (for example, read only memory (ROM)), a data storage area (for example, random access memory (RAM)), or another non-transitory computer readable medium. The first and second processors 102, 104 are coupled to the device memory 130 to execute computer-readable instructions stored in the device memory 130. The computer readable instructions stored in the device memory 130 may include firmware and/or software applications 136, among other program data, filters, rules, one or more program modules, and/or other executable instructions.

The first flash memory 132 and second flash memory 134 are a non-volatile, electrically-rewritable computer readable storage medium. The first flash memory 132 includes a first bootloader 138, a first limited functionality boot image 140, and a first full functionality boot image 142. Similarly, the second flash memory 134 includes a second bootloader 144, a second limited functionality boot image 146, and a second full functionality boot image 148. In some embodiments, all or part of the bootloaders 138, 144 and the boot images 140, 142, 146, 148 may be stored in a read only memory of the device memory 130.

In accordance with embodiments, each of the first and second electronic processing units 110, 114 of the respective first and second processors 102, 104, loads the respective first and second bootloaders 138, 144 when the multi-processor device 100 is powered on. The first and second electronic processing units 110, 114 independently and concurrently execute separate boot processes in two stages (i.e., initial boot process stage and main boot process stage). During the initial boot process stage, the first bootloader 138 initiates a start-up of the first processor 102 by retrieving a first limited functionality boot image 140 from the first flash memory 132 and loading it into the device memory 130. The first electronic processing unit 110 of the first processor 102 is configured to read and execute the first limited functionality boot image 140 loaded into the device memory 130. In some embodiments, the first limited functionality boot image 140 remains in, and executed from, the first flash memory 132. In accordance with embodiments, the first limited functionality boot image 140 refers to a memory image that includes limited set of instructions required for the first processor 102 to: process a request for key material received from the second processor 104; extract and unseal the key material 122 stored at the hardware-backed key storage 113 or alternatively derive a new key material 122 at the hardware key derivation function 115; transfer the key material 122 to the second processor 104 via the inter-processor communications data link 106; and erase temporary instances of the key material 122 stored outside of the secure key derivation and storage component 112. In other words, the first limited functionality boot image 140 does not include instructions for bringing the multi-processor device 100 to a full-functional state (i.e., firmware, application etc., are not loaded at this point during the execution of the initial boot process by the first processor 102). Accordingly, when the temporary instances of the key material 122 stored outside of the secured key derivation and storage component 112 are erased, the bootloader 138 initiates a main boot process (i.e., a second stage of the boot process) by retrieving the first full functionality boot image 142 from the flash memory 132 and loading it into the device memory 130. The first processor 102 then reads and executes the first full functionality boot image 142 loaded into the device memory 130. In accordance with embodiments, the first full functionality boot image 142 refers to a memory image that includes an operating system kernel as well as any file systems, libraries, and program necessary to bring the multi-processor device 100 to a full-functional state.

In accordance with embodiments, when the multi-processor device 100 is powered on, the second processor 104 also executes a separate initial boot process concurrently with the execution of the initial boot process by the first processor 102. During the initial boot process stage at the second processor 104, the second bootloader 144 initiates a start-up of the second processor 104 by retrieving a second limited functionality boot image 146 and loading it into the device memory 130. The second electronic processing unit 114 of the second processor 104 is configured to read and execute the second limited functionality boot image 146. In some embodiments, the second limited functionality boot image 146 remains in, and executed from, the second flash memory 134. In accordance with embodiments, the second limited functionality boot image 146 refers to a memory image that includes limited set of instructions required for the second processor 104 to: provision the secure storage container 116 to hold a key material; to request a key material from the first processor 102; receive a key material 122 from the first processor 102; and erase temporary instances of the key material 122 stored outside of the secure storage container 116. In other words, the second limited functionality boot image 146 does not include instructions for bringing the multi-processor device 100 to a full-functional state (i.e., firmware, application etc., are not loaded at this point during the execution of the initial boot process by the second processor 104). Accordingly, when the temporary instances of the key material 122 stored outside of the secure storage container 116 are erased, the second bootloader 144 then initiates a main boot process (i.e., a second stage of the boot process) by retrieving the second full functionality boot image 148 from the second flash memory 134 and loading it into the device memory 130. The second processor 104 then reads and executes the second full functionality boot image 148 loaded into the device memory 130. In accordance with embodiments, the second full functionality boot image 148 refers to a memory image that includes an operating system kernel as well as any file systems, libraries, and program necessary to bring the multi-processor device 100 to a full-functional state. For example, the firmware/application 136 is loaded and executed by the first and/or the second processors 102, 104 after the first and/or second processors 102, 104 have respectively executed the main boot processes by loading the respective first and second full functionality boot images 142, 148. At this point (i.e., after the multi-processor device 100 is brought to a full-functional state), since temporary instances of the key material are already erased (prior to executing the main boot process) from memory locations outside of the secured key derivation and storage component 112 and secure storage container 116, the firmware/application 136 cannot access the key material 122 transferred from the first processor 102 to the second processor 104. However, the firmware/application can access data 136 encrypted using the key material 122 and further stored at the data store 124 by interfacing with the secure storage service 128. In accordance with some embodiments, instructions required for executing the cryptographic engine 126 and secure storage service 128 are included in the second full functionality boot image 148 and further loaded at the second processor 104 during the execution of the main boot process to facilitate the access of data 125 encrypted and stored at the secure storage container 116 by authorized firmware and/or applications.

Figure 2:
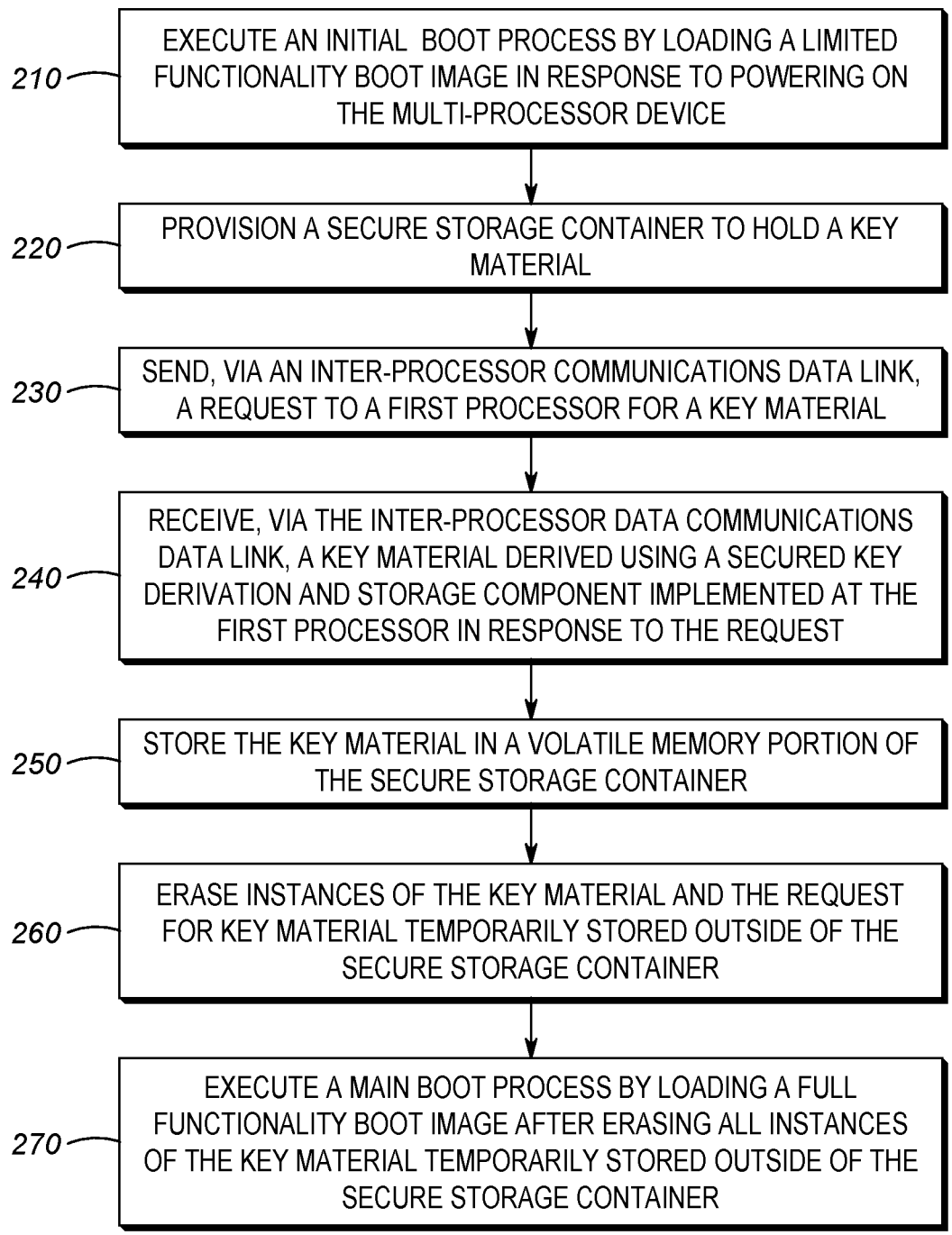
FIG. 2 is a flowchart illustrating a method of securely transferring key materials between processors in a multi-processor device in accordance with some embodiments.

Turning now to FIG. 2, a flowchart diagram illustrates a method 200 of securely transferring key material between processors in a multi-processor device 100 shown in FIG. 1. The method 200 shown in FIG. 2 is particularly described with respect to the functions executed at the second processor 104 of the multi-processor device. While a particular order of processing steps, message receptions, and/or message transmissions is indicated in FIG. 2 as an example, timing and ordering of such steps, receptions, and transmissions may vary where appropriate without negating the purpose and advantages of the examples set forth in detail throughout the remainder of this disclosure. The second processor 104 shown in FIG. 1 may execute various portions of the method 200 via one or more of the second electronic processing unit 114 and second bootloader 144. The second-processor 104 may execute the method 200 when the device 100 is powered on for the first time, or when the device 100 is re-booted in response to a trigger raised locally at the device 100 via an internal process or via a user interface implemented at the multi-processor device 100, among other possibilities.

The method 200 of FIG. 2 need not be performed in the exact sequence as shown and likewise various blocks may be performed in different order or alternatively in parallel rather than in sequence. The method 200 may be implemented on variations of the multi-processor device 100 of FIG. 1 as well.

The method 200 begins at block 210 when the second processor 104 executes an initial boot process by loading a limited functionality boot image (i.e., second limited functionality boot image 146) in response to powering on of the multi-processor device 100.

Blocks 220 through 260 are performed during the execution of the initial boot process at the second processor 104. At block 220, the second processor 104 provisions a secure storage container 116 at one or more memory devices in the multi-processor device 100 for holding a key material. In accordance with embodiments, the second processor 104 is configured to provision the secure storage container 116 with access control permissions set to deny read, write, or execute access of contents stored within the secure storage container 116 to any programs residing outside of the secure storage container 116. For example, a firmware or software application 136 residing outside of the secure storage container 116 cannot access the key material that will be stored at the secure storage container 116 even after the multi-processor device 100 is brought to full-functional state with execution of the main boot process.

At block 230, the second processor 104 sends, via an inter-processor communications data link 106, a request to the first processor 102 for a key material.

At block 240, the second processor 104 receives, via the inter-processor communications data link 106, a key material 122 (e.g., a key encryption key) derived using a secured key derivation and storage component 112 implemented at the first processor 102 in response to the request sent at block 220.

At block 250, the second processor 104 stores the key material 122 in a volatile memory portion 118 of the secure storage container 116.

At block 260, the second processor 104 erases instances of key material 122 as well as messages (e.g., messages used to request and receive the key material) that are temporarily stored outside of the secure storage container 116 at the second processor 104. For example, instances of the key material 122 and messages used to request and receive the key material 122 may be temporarily stored in different memory locations (e.g., shared memory 108, internal RAM, external RAM, data cache, registers etc.) outside the secure storage container 116 while the key material 122 is transferred from the first processor 102 to the second processor 104. In one embodiment, when the inter-processor communications data link 106 is formed using the shared memory 108, the second processor 104 may generate and write a message on the shared memory 108 to request for a key material. In response, the first processor 102 reads the message from the shared memory 108 and responsively derives a key material 122 and writes a response message including the key material 122 into the shared memory 108. The second processor 104 then reads the key material 122 from the shared memory 108 and further stores the key material 122 in the volatile memory portion 118 of the secure storage container 116. After the key material 122 is securely stored in the volatile memory portion 118 of the secure storage container 116, the second processor 104 erases instances of the key material and corresponding messages written into the shared memory 108.

At block 270, the second processor executes a main boot process by loading a full-functionality boot image (i.e., second full functionality boot image 148) after erasing all instances of the key material 122 and corresponding messages temporarily stored outside of the secure storage container 116. During execution of the main boot process, programs such as an operating system kernel, firmware/application 136, and other programs such as cryptographic engine 126 and secure storage service 128 are loaded by the bootloader (i.e., second bootloader 144) from the second full functionality boot image 148 to bring the multi-processor device 100 to a full-functional state. In one embodiment, the secure storage service 128 accesses the key material 122 stored in the volatile memory portion 118 of the secure storage container 116 and further encrypts data 125 stored in the data store 124 via the cryptographic engine 126. In one embodiment, the encrypted data 125 may be stored in a data store 124 that is implemented using a non-volatile memory portion (e.g., at the device memory 130) that is located outside the second processor 104. A firmware/application 136 can access to the encrypted data 125 stored in the data store 124 within the secure storage container 116 by requesting access from the secure storage service 128. The secure storage service 128, in response, may verify whether the firmware/application 136 has authorization to access the encrypted data 125 stored in the data store 124. If authorization is verified, then the secure storage service 128 decrypts the encrypted data 125 with the key material 122 via the cryptographic engine 126. The secure storage service 128 then provides the firmware/application 136 with access to the decrypted data. For example, the decrypted data may include Wi-Fi passphrase needed to connect the firmware/application 136 to a wireless service.

Figure 3:
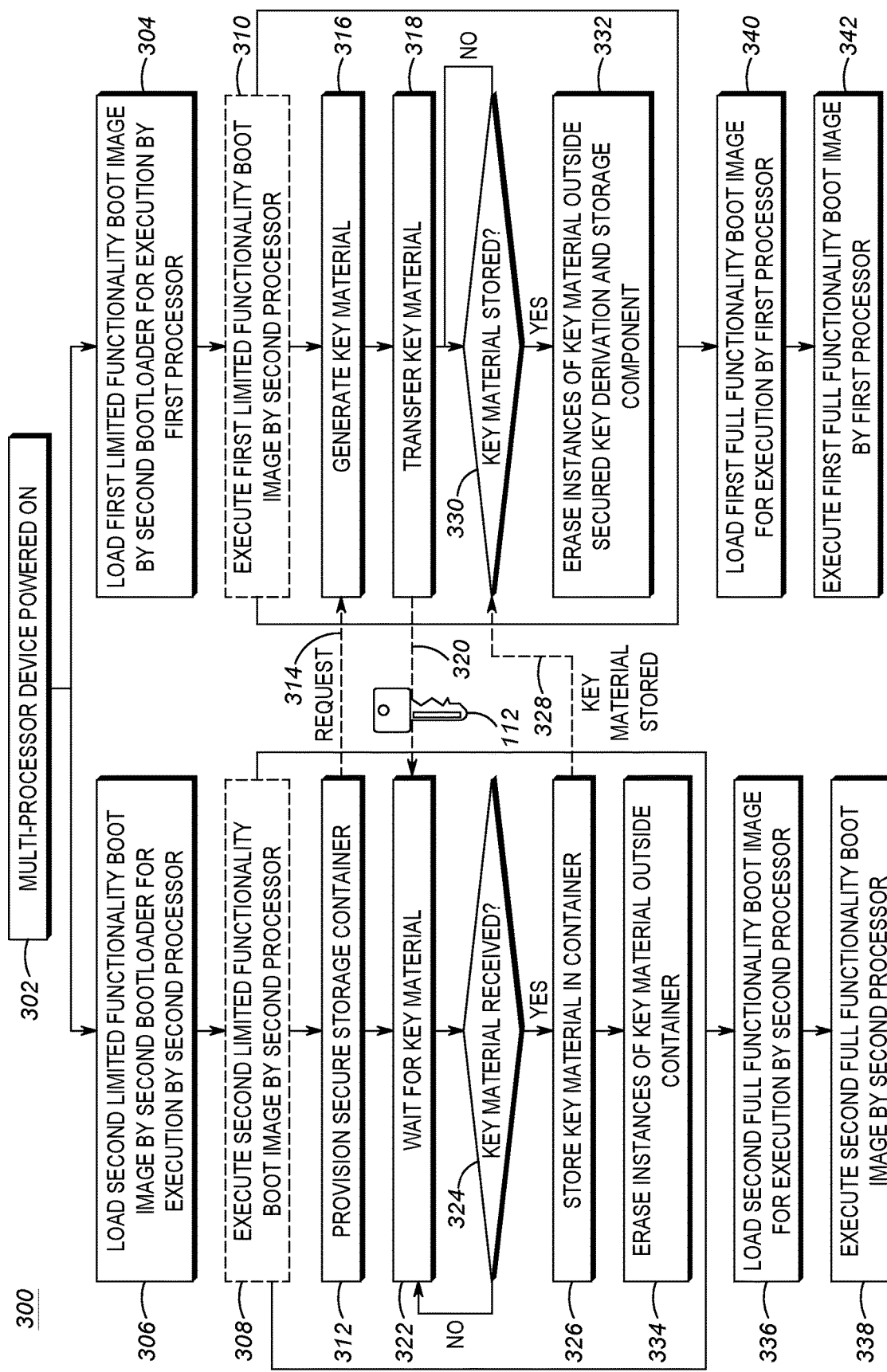
FIG. 3 is a process block diagram illustrating a method of securely transferring key material between processors in a multi-processor device in accordance with some embodiments.

Referring now to FIG. 3, a process block diagram illustrates a method 300 of securely transferring key material between processors in a multi-processor device 100 shown in FIG. 1. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. The multi-processor device 100 shown in FIG. 1 may execute various portions of the method 300 via one or more of the first electronic processing unit 110 of the first processor 102, second electronic processing unit 114 of the second processor 104, first bootloader 138, and second bootloader 144 implemented at the multi-processor device 100. The multi-processor device 100 may execute the method 300 when the device 100 is powered on for the first time, or when the device 100 is re-booted in response to a trigger raised locally at the device 100 via an internal process or via a user interface implemented at the multi-processor device 100, among other possibilities. In accordance with embodiment, the method 300 is executed by the multi-processor device 100 to transfer a key material from the first processor 102 to the second processor 104 each time the multi-processor device is powered on or restarted.

At block 302, a multi-processor device 100 is powered on.

At block 304, a bootloader (e.g., first bootloader 138) loads a limited functionality boot image (e.g., first limited functionality boot image 140) into a device memory 130 for execution by the first processor 102 when the multi-processor device 100 is powered on.

At block 306, a boot loader (e.g., second bootloader 144) also concurrently loads a limited functionality boot image (e.g., second limited functionality boot image 146) into the device memory 130 for execution by the second processor 104 when the multi-processor device 100 is powered on.

At blocks 308 and 310, the first processor 102 and the second processor 104 respectively and concurrently execute the respective first and second limited functionality boot images 140, 146 to initiate a process for transferring key material from the first processor 102 to the second processor 104. Blocks 312, 322, 324, 326, and 334 are performed during the execution of the second limited functionality boot image 146 by the second processor 104. Similarly, blocks 316, 318, 330, and 332 are performed during the execution of the first limited functionality boot image 140 by the first processor 102.

At block 312, the second processor 104 provisions a secure storage container 116 at one or more memory devices implemented inside or external to the second processor 104 in the multi-processor device 100 for holding a key material. In accordance with embodiments, the second processor 104 is configured to provision the secure storage container 116 with access control permissions set to deny read, write, or execute access of contents stored within the secure storage container 116 to any programs residing outside of the secure storage container 116. The second processor 104 then sends, via the inter-processor communications data link 106, a message 314 including a request for key material from the first processor 102.

At block 316, the first processor 102 receives the message 314 including the request from the second processor 104 and in response generates a key material 122 using the secured key derivation and storage component 112. In one embodiment, the key material is a derived key encryption key (DKEK) that is derived by the hardware key derivation function 115 from a key encryption key (KEK) previously generated and stored at the hardware-backed key storage 113. In another embodiment, the key material 122 is a new key encryption key that is different from the key encryption key previously generated and stored at the hardware-backed key storage 113. In a further embodiment, the key material is the same as the key encryption key stored at the hardware-backed key storage 113. At block 318, the first processor 102 transfers a message 320 including the key material 122 to the second processor 104 via the inter-processor communications data link 106.

At block 322, the second processor 104, after sending the request 314 for key material, waits for the key material to be received from the first processor 102 and periodically determines at block 324 if the second processor 104 has received any signal indicating a response from the first processor 102. If no signal is received, the second processor 104 continues to wait for key material to be received from the first processor 102. Alternatively, the second processor 104 waits for a predetermined period of time and when the predetermined period of time lapses, the second processor 104 proceeds to re-send the message 314 including the request for key material to the first processor 104. When the second processor 104 determines at block 324 that it has received the key material 122, the second processor 104 proceeds to block 326 to store the key material 122 in a volatile memory portion 118 of the secure storage container 116. In accordance with some embodiments, the second processor 104 may also derive and store additional child key encryption keys at volatile memory portion 118 of the secure storage container 116 using the key material 122 transferred from the first processor 102.

At block 330, the first processor 102, after transferring the key material 122 to the second processor 104, determines whether the key material is successfully stored at the second processor 104. For example, the second processor 104 may send a message 328 indicating that it has successfully received and stored the key material 122 transferred from the first processor 102. When the first processor 102 receives the message 328 from the second processor 104 indicating that the second processor 104 has successfully received and stored the key material transferred from the first processor 102, the first processor 102 proceeds to block 332 to erase instances of the key material 122 and corresponding messages 314, 320, 328 used to transfer the key material 122 from memory locations outside of the secured key derivation and storage component 112. For example, instances of the key material 122 and messages 314, 320, 328 may be temporarily stored in different memory locations (e.g., shared memory 108, internal RAM, external RAM, data cache, registers etc.) outside the secured key derivation and storage component 112 while the key material is transferred from the first processor 102 to the second processor 104. In one embodiment, when the inter-processor communications data link 106 is formed using the shared memory 108, the first processor 102 generates a key material 122 and writes a message 320 including the key material 122 into the shared memory 108. In this embodiment, the first processor 102 may erase the message 320 including the key material 122 written into the shared memory 108.

Similarly, at block 334, the second processor 104 also erases instances of the key material 122 temporarily stored in different memory locations outside of the secure storage container 116. For example, instances of the key material 122 and messages 314, 320, 328 may be temporarily stored in different memory locations (e.g., shared memory 108, internal RAM, external RAM, data cache, registers etc.) outside the secure storage container 116 while the key material is transferred from the first processor 102 to the second processor 104. In one embodiment, when the inter-processor communications data link 106 is formed using the shared memory 108, the second processor 104 may generate and write a message 314 on the shared memory 108 to request for a key material. In response, the first processor 102 derives a key material 122 and writes a response message 320 including the key material 122 on the shared memory 108. The second processor 104 then reads the key material 122 from the shared memory 108 and further stores the key material 122 in the volatile memory portion 118 of the secure storage container 116. In this embodiment, the second processor 104 may erase the messages 314, 320 as well as the key material 122 written into the shared memory 108.

At block 336, the second bootloader 144 loads a full-functionality boot image (i.e., second full functionality boot image 148) after the second processor 104 has erased all instances of the key material 122 and corresponding messages 314, 320, 328 temporarily stored outside of the secure storage container 116 at block 334. The second processor 104 then proceeds to block 338 to execute the second full functionality boot image 148. During execution of the second full functionality boot image 148, programs such as the operating system kernel, firmware/application 136, and other programs such as cryptographic engine 126 and secure storage service 128 are loaded by the second bootloader 144 from the second full functionality boot image 148 to bring the multi-processor device 100 to a full-functional state. In one embodiment, the secure storage service 128 accesses the key material 122 stored in the volatile memory portion 118 of the secure storage container 116 and further encrypts data 125 stored in the data store 124 via the cryptographic engine 126. In one embodiment, the encrypted data 125 may be stored in a data store 124 that is implemented using a non-volatile memory portion that is located outside of the second processor 104. Programs such as the firmware/application 136 can access the encrypted data 125 stored in the data store 124 within the secure storage container 116 by requesting access from the secure storage service 128. The secure storage service 128, in response, may verify whether the firmware/application 136 has authorization to access the encrypted data 125 stored in the data store 124. If authorization is verified, then the secure storage service 128 decrypts the encrypted data 125 with the key material 122 via the cryptographic engine 126. The secure storage service 128 then provides the firmware/application 136 with access to the decrypted data. For example, the decrypted data may include Wi-Fi passphrase needed to connect the firmware/application 136 to a wireless service.

Similarly, at block 340, the first bootloader 138 may also load a first full functionality boot image 142 after the first processor 102 has erased all instances of the key material 122 and corresponding messages 314, 320, 328 temporarily stored outside of the secured key derivation and storage component 112. The first processor 102 then proceeds to block 336 to execute the second full functionality boot image 148 to bring the multi-processor device 100 to a full-functional state.

Accordingly, embodiments described herein can be advantageously implemented to securely transfer key materials between secure and non-secure processors in a multi-processor device. Radio communication devices are often built on multi-processor architecture with one processor having hardware-backed secure key derivation and storage capability and another processor that does not have the key generation or secure key storage capability. Embodiments described herein can be implemented in such devices to enable a processor without the key derivation or secure key storage capability to securely obtain a key material from a processor with the hardware-backed key derivation and storage capability. Since the key material is transferred during an initial boot process, programs such as firmware, or software application are not yet loaded for execution and accordingly such programs are prevented from accessing any key material transferred from one processor to another processor. In addition, since the processor without the hardware-backed key derivation and storage capability holds the obtained key material in a software confined container domain, any programs that are loaded for execution after the multi-processor device is brought into a full-functional state are also restricted from reading, writing, or executing contents stored within the software confined domain. Accordingly, a radio communication device implemented with the embodiments described herein is able to transfer key materials between processors in a secure manner.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A multi-processor device, comprising:
   a first processor implemented with a secured key derivation and storage component;
   a second processor implemented without a secured key derivation and storage component; and
   an inter-processor communications data link enabling the first and second processors to exchange data with each other,
   wherein the second processor is configured to execute an initial boot process by loading a limited functionality boot image when the multi-processor device is powered on, and further wherein the second processor is configured to, during the execution of the initial boot process:
- provision a secure storage container to hold a key material;
- send, via the inter-processor communications data link, a request to the first processor for the key material;
- receive, via the inter-processor communications data link, a key material derived using the secured key derivation and storage component implemented at the first processor in response to the request;
- store the key material in a volatile memory portion of the secure storage container; and
- erase instances of the key material temporarily stored outside of the secure storage container.

2. The multi-processor device of claim 1, wherein the secured key derivation and storage component implemented at the first processor includes a hardware-backed key storage and a hardware key derivation function.

3. The multi-processor device of claim 1, wherein the second processor is configured to provision the secure storage container with access control permissions set to deny read, or write, or execute access of contents stored within of the secure storage container to any programs residing outside of the secure storage container.

4. The multi-processor device of claim 1, wherein the second processor is configured to encrypt data using the key material stored in the volatile memory portion of the secure storage container to generate encrypted data, and store the encrypted data in a non-volatile memory portion of the secure storage container.

5. The multi-processor device of claim 1, wherein the second processor is further configured to execute a main boot process by loading a full functionality boot image after erasing the instances of the key material temporarily stored outside of the secure storage container.

6. The multi-processor device of claim 5, further comprising:
- a firmware or software application loaded for execution by the second processor after the execution of the full functionality boot image at the second processor, wherein the firmware or software application is restricted from accessing the key material stored in the volatile memory portion of the secure storage container.

7. The multi-processor device of claim 6, wherein the firmware or software application interfaces with a secure storage service residing within the secure storage container to obtain access to data encrypted using the key material stored in the volatile memory portion of the secure storage container.

8. The multi-processor device of claim 1, wherein the first processor is configured to execute a separate initial boot process concurrently with the execution of the initial boot process by the second processor by loading a limited functionality boot image when the multi-processor device is powered on, and further wherein the first processor is configured to, during the execution of the separate initial boot process:
- receive, via the inter-processor communications data link, the request for the key material from the second processor, and responsively derive the key material using the secured key derivation and storage component at the first processor;
- send, via the inter-processor communications data link, the key material to the second processor in response to the request; and
- erase instances of the key material temporarily stored outside of the secured key derivation and storage component at the first processor.

9. The multi-processor device of claim 1, wherein the first processor is further configured to execute a full functionality boot image after erasing instances of the key material stored outside of the secured key derivation and storage component.

10. The multi-processor device of claim 1, wherein the key material is a derived key encryption key that is derived by the first processor using a key encryption key generated and stored at the secured key derivation and storage component.

11. The multi-processor device of claim 1, wherein the inter-processor communications data link is formed using a shared memory that is accessible to both the first and second processors, and further wherein the second processor is configured to erase instances of the key material that are stored at the shared memory while the key material is transferred from the first processor to the second processor.

12. The multi-processor device of claim 1, wherein the limited functionality boot image represents a memory image including limited set of instructions required for the second processor to provision the secure storage container to hold the key material; to request the key material from the first processor; receive the key material from the first processor via the inter-processor communications data link; and erase temporary instances of the key material stored outside of the secure storage container.

13. The multi-processor device of claim 1, wherein a firmware or software application is not loaded during the execution of the initial boot process by the second processor.

14. A method of securely transferring key material between processors in a multi-processor device comprising a first processor implemented with a secured key derivation and storage component and a second processor implemented without a secured key derivation and storage component, the method comprising:
- executing, at the second processor, an initial boot process by loading a limited functionality boot image when the multi-processor device is powered on, wherein executing the initial boot process at the second processor further comprises:
  - provisioning a secure storage container to hold a key material;
  - sending, via an inter-processor communications data link established between the first processor and the second processor, a request to the first processor for the key material;
  - receiving, via the inter-processor communications data link, the key material derived using the secured key derivation and storage component implemented at the first processor in response to the request;
  - storing the key material in a volatile memory portion of the secure storage container; and
  - erasing instances of the key material temporarily stored outside of the secure storage container.

15. The method of claim 14, wherein the secured key derivation and storage component implemented at the first processor includes a hardware-backed key storage and a hardware key derivation function.

16. The method of claim 14, wherein provisioning comprises:
- provisioning, at the second processor, the secure storage container with access control permissions set to deny read, or write, or execute access of contents stored within of the secure storage container to any programs residing outside of the secure storage container.

17. The method of claim 14, further comprising:

encrypting, at the second processor, data using the key material stored in the volatile memory portion of the secure storage container to generate encrypted data; and storing, at the second processor, the encrypted data in a non-volatile memory portion of the secure storage container.

18. The method of claim 14, further comprising:

executing, at the second processor, a main boot process by loading a full functionality boot image after erasing the instances of the key material temporarily stored outside of the secure storage container.

19. The method of claim 18, wherein loading the full functionality boot image comprises:

loading a firmware or software application for execution by the second processor after the execution of the full functionality boot image at the second processor, wherein the firmware or software application is restricted from accessing the key material stored in the volatile memory portion of the secure storage container.

20. The method of claim 14, further comprising:

executing, at the first processor, a separate initial boot process concurrently with the execution of the initial boot process by the second processor by loading a limited functionality boot image when the multi-processor device is powered on, wherein executing the separate initial boot process at the first processor comprises:

receiving, via the inter-processor communications data link, the request for the key material from the second processor, and responsively deriving the key material using the secured key derivation and storage component at the first processor;

sending, via the inter-processor communications data link, the key material to the second processor in response to the request; and erasing instances of the key material temporarily stored outside of the secured key derivation and storage component at the first processor.

\* \* \* \* \*